(12) United States Patent
Yablokov et al.

(10) Patent No.: US 12,425,422 B2
(45) Date of Patent: Sep. 23, 2025

(54) SYSTEM AND METHOD FOR PROVIDING SECURITY TO IoT DEVICES

(71) Applicant: AO Kaspersky Lab, Moscow (RU)

(72) Inventors: Victor V. Yablokov, Moscow (RU); Konstantin M. Filatov, Moscow (RU)

(73) Assignee: AO Kaspersky Lab, Moscow (RU)

(*) Notice: Subject to any disclaimer, the term of this patent is extended or adjusted under 35 U.S.C. 154(b) by 186 days.

(21) Appl. No.: 18/341,814

(22) Filed: Jun. 27, 2023

(65) Prior Publication Data

US 2024/0089271 A1    Mar. 14, 2024

(30) Foreign Application Priority Data

Sep. 8, 2022 (RU) ................................ 2022123909

(51) Int. Cl.
*H04L 9/40*      (2022.01)

(52) U.S. Cl.
CPC ...... *H04L 63/1416* (2013.01); *H04L 63/1425* (2013.01)

(58) Field of Classification Search
CPC .............. H04L 63/1416; H04L 63/1425
USPC ........................................................ 726/23
See application file for complete search history.

(56) References Cited

U.S. PATENT DOCUMENTS

| | | | |
|---|---|---|---|
| 8,214,904 B1* | 7/2012 | Doukhvalov | G06Q 10/00 726/26 |
| 9,800,554 B2* | 10/2017 | Van Roermund | H04L 63/065 |
| 2017/0126707 A1* | 5/2017 | Prokudin | H04L 63/1441 |
| 2018/0040172 A1* | 2/2018 | Funk | G07C 5/0808 |
| 2018/0041546 A1* | 2/2018 | Gomez | H04L 63/205 |
| 2018/0115530 A1* | 4/2018 | Ranjan | G06F 21/85 |
| 2018/0205754 A1* | 7/2018 | North | H04L 63/145 |
| 2019/0215688 A1* | 7/2019 | Zavesky | H04L 67/56 |
| 2019/0260785 A1* | 8/2019 | Jenkinson | H04L 63/14 |
| 2019/0306242 A1* | 10/2019 | Thummalapalli | H04L 41/0806 |
| 2019/0312839 A1 | 10/2019 | Grimm | |
| 2022/0086179 A1* | 3/2022 | Levin | H04W 12/63 |
| 2022/0269817 A1* | 8/2022 | Nalluri | H04L 63/1441 |

* cited by examiner

*Primary Examiner* — Badri Narayanan Champakesan
(74) *Attorney, Agent, or Firm* — ArentFox Schiff LLP; Michael Fainberg (57) ABSTRACT

Disclosed herein are systems and methods for providing security to an Internet of Things (IoT) device. An exemplary method comprises, obtaining, by an interceptor located on at least one gateway or the device, information about an interaction of the device with at least one of: other devices, service, and server; by an analysis tool located on the gateway: determining at least one category of the device and at least one category of a user of the device by interacting with a security service based on information received about the interaction of the device; receiving data from the security service, and identifying the security component to be installed on the device based on the data received from the security service, the category of the device and the category of a user of the device; and installing on the device, by the interceptor, the security component identified by the analysis tool.

18 Claims, 4 Drawing Sheets

SYSTEM AND METHOD FOR PROVIDING SECURITY TO IoT DEVICES

CROSS REFERENCE TO RELATED APPLICATIONS

The present application claims priority to Russian Patent Application No. 2022123909, filed on Sep. 8, 2022, the entire content of which is incorporated herein by reference.

FIELD OF TECHNOLOGY

The present disclosure relates to the field of information security, and, more specifically to systems and method for providing security to Internet of Things (IoT) devices.

BACKGROUND

An increasing number of electronic devices, such as computers, smartphones and household appliances, can communicate via Wi-Fi or Bluetooth networks and connect to the Internet. These devices are generally referred to as smart devices or Internet of Things (IoT) devices (these terms will be used interchangeably hereinafter). When a number of IoT devices is connected to home Wi-Fi network, they form a "smart home". Integrating the devices into the smart home allows users to control such devices from one point, to check the statuses of the devices and their respective functionalities, and to adjust the devices based on the users' personal needs.

Not surprisingly, as the number of devices that have the ability to network increases, the number of attempts to maliciously use such devices began to grow. Currently, one of the significant problems is the spread of malware that infects IoT devices. IoT devices often do not have a high-performance computing platform as a rule. Instead, these devices are typically based on the ARM architecture for small platforms. Thus, these IoT devices run a small operating system (OS) or a simple boot loader that is used to access limited resources. As such, the use of any security policies or antivirus applications on such device is impractical and sometimes impossible.

In addition, IoT devices can generate a large amount of traffic, which is used by creators of botnets. An example is the "Hide 'N' Seek" botnet, which uses a Peer-to-Peer (P2P) communication for its infrastructure, which makes it even more difficult to detect.

It is worth noting that the widespread use of IoT devices may be accompanied by a violation of people's privacy. On one hand, a person can trust a number of devices to monitor data that can directly or indirectly relate to his personal information. The personal information may include one or more of: a pulse rate, calorie consumption (e.g., monitored via "smart" fitness bracelet), call frequency (e.g., monitored via a "smart" watch), temperature and humidity in a house (e.g., monitored via "smart" appliances such as a thermometer, a hygrometer with feedback), and others. Although the level and quality of service directly depends on the use of information from such devices, not all people are ready to allow the transfer of all or at least part of the personal information to the Internet.

One of the latest growing concerns is another type of security issue associated with the functioning of the smart device within the framework of a smart home. For example, it may be unacceptable that the air temperature increases above 23-25 degrees Celsius during the warm season, even if the settings allow the user to raise the temperature higher.

In addition, this security issue may be taken advantage of by intruders, for instance, by disabling a number of sensors and/or changing settings. Such problems may be catastrophic if vulnerabilities are exploited. For example, for Industrial IoT (IIoT) applications, the IIoT includes a multi-level system that includes sensors and controllers installed on the nodes and assemblies of an industrial facility, means of transmitting the collected data, means of visualization, and means of performing the analysis of the collected data. If one of these nodes in the multi-level system is compromised, then it is quite possible that service is refused not just to one device or a set of devices in the house—rather service is refused to critical infrastructure within a whole city. A change in the operation or failure of critical infrastructure within the whole city may have catastrophic consequences. For example, urban traffic management systems or the work of city cameras may be impacted by the action of the intruder.

Therefore, there is a need for a method and a system for increasing the security of IoT devices in an optimal manner without requiring full operating system and computing platforms.

SUMMARY

Aspects of the disclosure relate to increasing the security of IoT devices, more specifically to systems and method for providing security to a network device by installing security components, e.g., by installing security components on IoT devices in a network.

In one exemplary aspect, a method is provided for providing security to a network device, the method comprising: obtaining, by an interceptor located on at least one gateway or the device, information about an interaction of the device with at least one of: one or more other devices, a service, and a server; by an analysis tool located on the at least one gateway: determining at least one category of the device and at least one category of a user of the device by interacting with at least one security service based on the information received about the interaction of the device from the interceptor, receiving data from the at least one security service, the data comprising: data about the device, data about cyber threats depending on the least one category of the device and at least one category of a user of the device, and data describing a security component, wherein the security component is based on at least one type of cyber threat; and identifying the security component to be installed on the device based on the data received from the at least one security service, the at least one category of the device and the at least one category of a user of the device; and installing on the device, by the interceptor, the security component identified by the analysis tool.

In one aspect, the interceptor obtains the information about the interaction of the device by performing at least one of: intercepting Domain Name Service (DNS)/Hypertext Transfer Protocol (HTTP)/Hypertext Transfer Protocol Secure (HTTPS) requests from devices; extracting domain and Uniform Resource Locator (URL) data from intercepted requests; intercepting incoming traffic to devices on a predefined set of Transmission Control Protocol/User Datagram Protocol (TCP/UDP) ports; and checking whether the device has an open TCP/UDP port that provides remote access to the device.

In one aspect, the data about the device comprises at least one of: a description of the device, a firmware of the device, and a weak password for the device.

In one aspect, the data about cyber threats depending on the least one category of the device and at least one category of a user of the device comprise at least one of: a domain and Uniform Resource Locator (URL) used by malicious device applications, data about open Telecommunications and Networks/Secure Shell (telnet/SSH) ports for the device, and data for detecting malicious applications when a malicious application is invoked.

In one aspect, the device includes the security component or the interceptor depending on the description of the device.

In one aspect, the security service assembles the security component.

In one aspect, when the interceptor is located on the at least one gateway, the method further comprises installing, by the interceptor located on the at least one gateway, an interceptor on the device for which network security is provided.

According to one aspect of the disclosure, a network device security system comprising at least one gateway comprising at least one hardware processor and at least one memory is provided, the gateway including an analysis tool and an interceptor, the gateway communicating with at least one device and at least one security service, wherein the interceptor performs: obtaining information about an interaction of a device with at least one of: one or more other devices, a service, and a server; and installation, on the device, of a security component identified by the analysis tool; wherein the analysis tool performs: determining at least one category of the device and at least one category of a user of the device by interacting with the at least one security service based on the information about the interaction of the device obtained from the interceptor, interacting with the at least one security service to received data from the at least one security service, and identifying the security component for installing on the device based on data received from the security service, the determined at least one category of the device and the at least one category of a user of the device; and wherein the at least one security service provides data to the analysis tool, wherein the data comprises data about the device, data about cyber threats depending on the least one category of the device and at least one category of a user of the device, and data describing the security component, wherein the security component is based on at least one type of cyber threat.

In one exemplary aspect, a non-transitory computer-readable medium is provided storing a set of instructions thereon for providing security to a network device, wherein the set of instructions comprises instructions for: obtaining, by an interceptor located on at least one gateway or the device, information about an interaction of the device with at least one of: one or more other devices, a service, and a server; by an analysis tool located on the at least one gateway: determining at least one category of the device and at least one category of a user of the device by interacting with at least one security service based on the information received about the interaction of the device from the interceptor, receiving data from the at least one security service, the data comprising: data about the device, data about cyber threats depending on the least one category of the device and at least one category of a user of the device, and data describing a security component, wherein the security component is based on at least one type of cyber threat; and identifying the security component to be installed on the device based on the data received from the at least one security service, the at least one category of the device and the at least one category of a user of the device; and installing on the device, by the interceptor, the security component identified by the analysis tool.

The method and system of the present disclosure for providing security to a network device address the limitations of existing ways of providing security to IoT devices. Thus, the present method reduces the risk to personal information that may be available to IoT devices.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for providing security to a network device, e.g., an IoT device, by installing security components in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

For ease of describing the present disclosure, terminologies used in the description are introduced below.

In the context of the present disclosure, the term "device" refers to a hardware a complete technical design that has a certain functional value. For example, a device may be a router, a smartphone, a webcam, or similar device.

The term "IoT devices" refers to everyday objects or devises such as watches, cameras, refrigerators, voice recorders, bracelets, heart rate monitors, thermostats, and others that have access to the Internet (or local-area network) through various types of wired and wireless connections, such as Wi-Fi or Bluetooth. These devices or IoTs create network connections, receive and process incoming traffic, have an interface for interaction (Application Programming Interface, API), which allows not only the parameters of a thing (device) to be tracked, but also configured. In addition, IoT devices can include a range of network devices, such as signal amplifiers or media consoles.

IoT devices have applications in various sectors, such as automotive, consumer goods (for example, smart watches), infrastructure items (various sensors, for example, a humidity sensor or a temperature sensor), medicine (for example, a heart pacemaker with the ability to send data on its operation to a local server), smart home/building, and others. Often, IoT devices are combined into an infrastructure that enables tasks to be performed not only at the level of an individual or household, but also at the level of cities or states.

In addition, IoT devices are used for different purposes. Thus, when these devices are compromised, suffer theft or damage, the consequences may be difference based on how and where the devices are used. In some case, entire infrastructures may be impacted.

Device interaction—refers to the exchange of data between device. In this case, the interaction may include: the exchange of data between devices using protocols (for example, Wi-Fi or Bluetooth) to establish a connection between devices or detect other devices, and the transfer of user data between devices (for example, the transfer of user messages from a smartphone to a tablet via a Wi-Fi network or transferring audio from a laptop to headphones via Bluetooth).

Anomaly—refers to an identified deviation, for example, in traffic pattern to or from a device. The anomaly is observed over a predetermined period of time. The predetermined period of time may be based on the application, user preference, etc.

Cyber-attack—refers to an unauthorized impact on a computer system or network by a special software or hardware in order to disrupt the operation of the computer system or network, to obtain classified information, etc.

Cyber threat—refers to having a large amount of data loss or disruption of the computer system or network as a result of a cyber-attack.

A "security component" refers to software and hardware that provides security for interactions of devices as well as for user data. The security component may be implemented by taking into account the capabilities of the hardware (for example, the AES instruction block in the central processor of the device). Examples of security components include device controllers, antivirus protections, and others. The device controllers include components that monitor attempts to connect external devices to the protected device via USB and components that prohibit or allow use in accordance with the specified rules of control of the device. The antivirus protection includes software or application that provides anti-virus protection of the device being protected.

A "category of device" refers to a concept that expresses the most general properties of the device. For example, the category of the device may be the type of device (e.g., smartphone, router, refrigerator), the type of connection to the device (e.g., whether the device can connect to other devices via wireless interfaces or wired), the security of the device (e.g., whether it is possible to install a security component on the device, or whether or not the hardware implementation of the device does not allow an installation of a security component on the device), and so on. Thus, for IoT devices, the term "category of IoT device" may be used to refer to the most general properties of the IoT device.

A "category of user of the device" refers to categories related to the user and may include one or more of: the age of the user, the role of the user in the family (parent, child), the experience of countering cyber threats of the device user (how technically literate the user is in cybersecurity), the role of the user in the enterprise (manager, accountant, security guard), the role of the user in the service infrastructure (client, guest, employee, administrator, and others).

Figure 4:
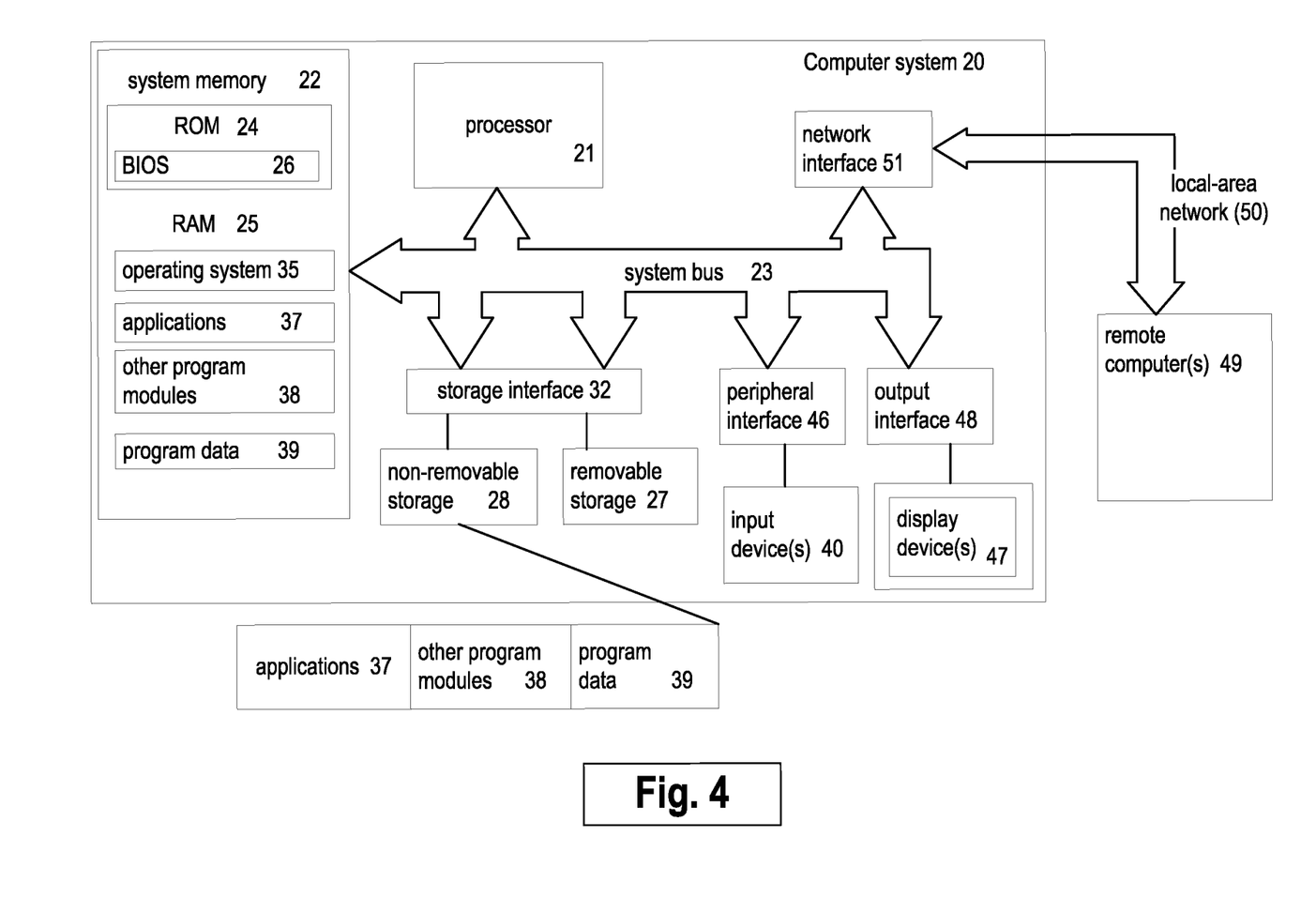
FIG. 4 presents an example of a general-purpose computer system on which aspects of the present disclosure can be implemented.

The system for securing IoT devices by installing security components of the present disclosure is understood as being implemented via real devices, systems, components, groups of components implemented using hardware, such as integrated circuits (application-specific integrated circuit, ASIC) or field-programmable gate array (FPGA), or, for example, as a combination of software and hardware, such as a microprocessor system and a set of software instructions, as well as on neuromorphic chips (neurosynaptic/neuromorphic chips). The functionality of said means of the system may be implemented solely by hardware, as well as in combination, wherein part of the functionality of the system means is implemented by software, and part by hardware. In some embodiments, part or all of the means of the present system may be executed on a processor of a general-purpose computer (for example, as shown in FIG. 4). In this case, the components (each of the means) of the system can be implemented within the framework of both one computing device and spaced between several interconnected computing devices.

Figure 1:
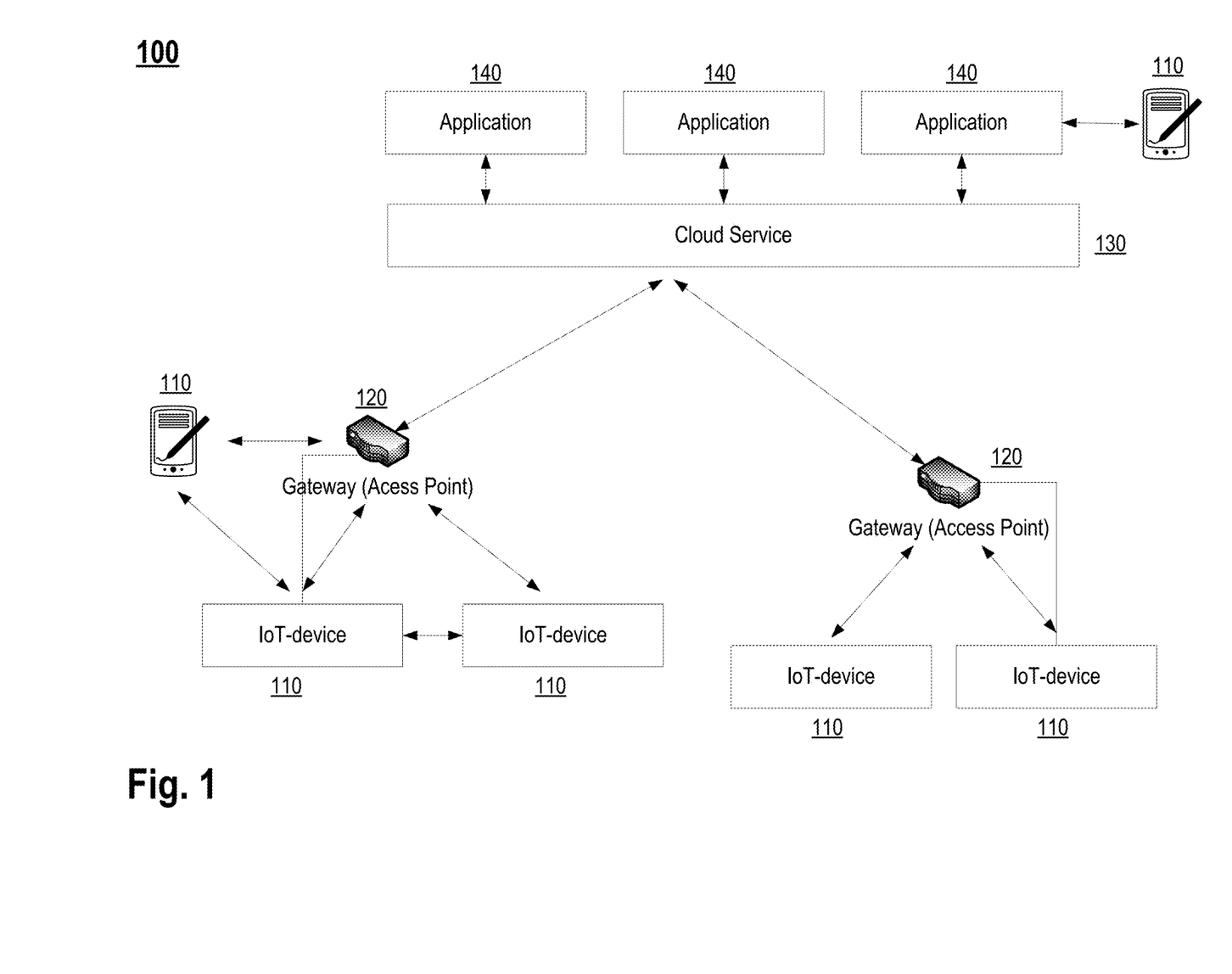
FIG. 1 illustrates a block diagram of an exemplary IoT infrastructure (ecosystem) in accordance with aspects of the present disclosure.

FIG. 1 illustrates a block diagram of an exemplary IoT infrastructure (ecosystem) 100 in accordance with aspects of the present disclosure. The IoT infrastructure 100 comprises a plurality of IoT devices 110, a plurality of gateways 120, the cloud service 130 and applications 140. The IoT devices 110 access the applications 140 via a gateway 120 and the cloud service 130.

The cloud service 130 may comprise one or more remote data processing servers. Within the cloud service 130, the applications 140 run to allow data from IoT devices 110 to be processed and interpreted. Users may use individual IoT devices 110 (these may be smartphones, personal computers, etc.) to control other IoT devices 110 either directly or through one or more of the applications 140. Typically, one or more gateways 120 with connected IoT devices 110 form a Personal Area Network (PAN).

The IoT devices 110 (hereinafter referred to as devices) can be both wearable objects for people (such as smartphones, smartwatches, etc.), and sensors inside vehicles or homes, a variety of sensors that may be deployed in an enterprise location. The IoT devices 110 receive, process, and transmit information (for example, temperature data) to other similar IoT devices 110 (for example, a smartwatch can be paired with a smartphone using the Bluetooth protocol). The transmission from one IoT device 110 to another IoT device 110 may be either via a direct connection or through a gateway 120 (e.g., an access point 120). The gateway 120 may be a home router or other network device (such as a hub or switch) designed to transmit data to a platform 130 (hereinafter a cloud service 130) over the network. The gateway 120 may support various communication protocols, for example, the ZigBee protocol may be used for some IoT devices 110, and an Ethernet connection may be used to connect the gateway 120 to the cloud service 130.

For an illustrative example, the platform 130 may comprise the smart home platform from Xiaomi. The IoT devices 110 may include Yeelight Smartbulb lighting lamps, a Mi Smart Power Plug surge protector, a Mi Smart Remote Central Control, and so on. In order to process data from these IoT devices 110, the proprietary platform 130 Mi Eco Cloud may be used. The proprietary platform 130 Mi Eco Cloud allows the use of various applications 140 (including third-party applications) for data processing and control of IoT devices 110.

Figure 2:
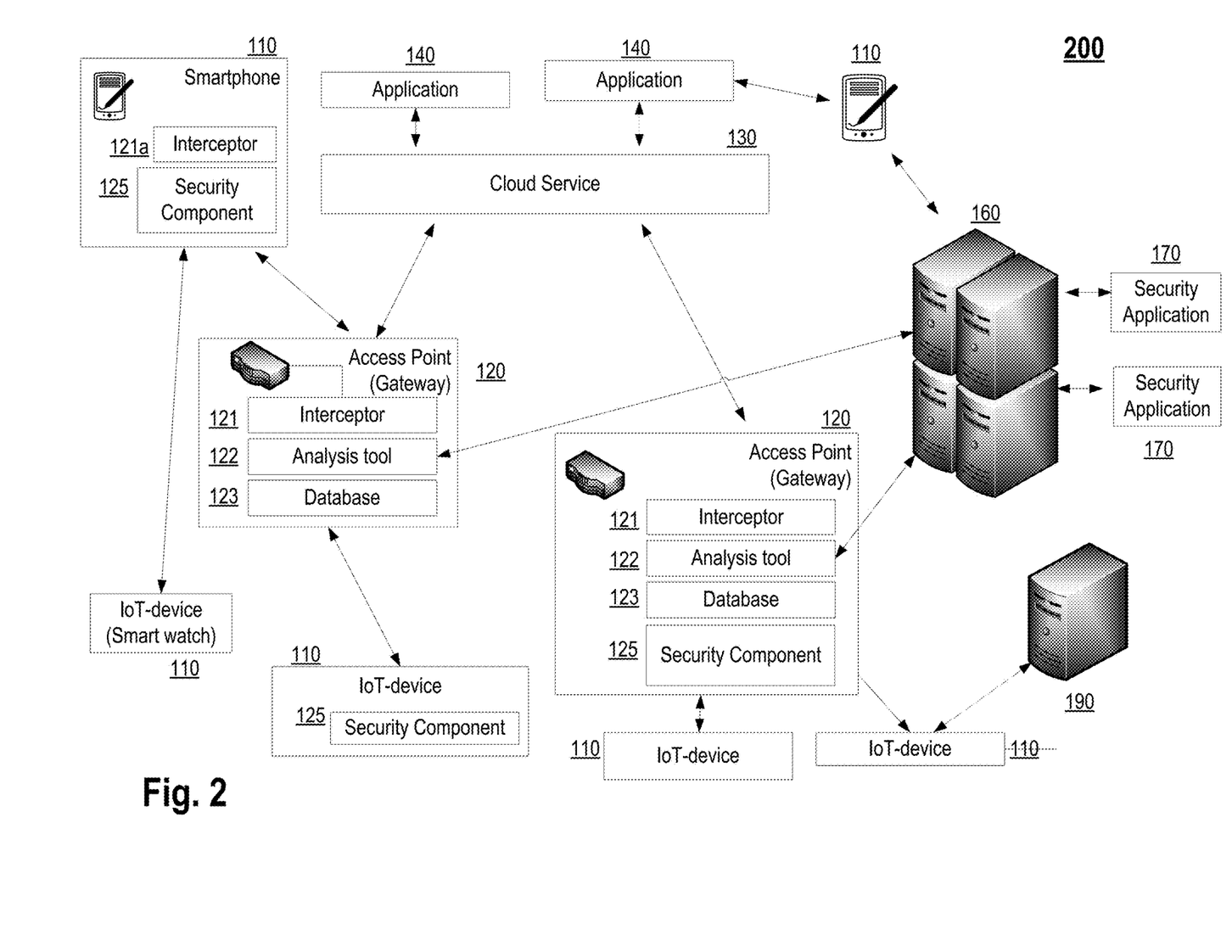
FIG. 2 illustrates a block diagram of an exemplary system for providing security to a network device, e.g., an IoT device, by installing security components in accordance with aspects of the present disclosure.

FIG. 2 illustrates a block diagram of an exemplary system 200 for providing security to a network device, e.g., an IoT device, by installing security components in accordance with aspects of the present disclosure.

Manufacturers of IoT devices 110 very often do not prioritize the security of these types of devices. Typically, a choice is made in favor of ease of configuration and use by end users. For instance, they may set standard logins/passwords to access the management console on all released devices of the same model, may not timely update the libraries installed on these devices with known vulnerabilities, etc. All these choices allow attackers to gain remote control over IoT devices 110, to use the compromised IoT device 110 either as part of botnets or in order to obtain private information about the user of the IoT device 110 for the purpose of subsequent blackmail, or to perform other malicious acts.

The technical specification of the IoT devices 110 (e.g., usage of non-standard firmware or operating system, a small amount of memory, the absence of a standard installation of third-party software provided by the manufacturer, autonomous operation without the possibility of constant charging) does not allow a user to install full-fledged protective and anti-virus solutions on the IoT devices.

Thus, in one aspect, the present disclosure provides an installation of a security components on the gateway 120 (routers, switches) through which the IoT devices 110 access the Internet. The IoT devices 110 may be in the local or home network of the user. The security components of the present disclosure minimize the likelihood of infection of these devices and reduce the consequences of infection of the IoT devices 110. In addition, the security solution may also identify infected IoT devices 110 in the home network.

In order to secure IoT devices 110, the method of the present disclosure installs security components. For example, the installation of the security component may include installing the security component on at least one IoT device 110 that interacts with the cloud service 130 and the applications 140 via at least one gateway 120. The gateway 120 may further include one or more of: an interceptor 121, and an analysis tool 122, and a database 123. The analysis tool 122 interacts with the security service 160 and the security applications 170.

The interceptor 121 is designed to obtain information about the interaction of IoT devices 110 with other devices 110, services and servers (cloud service 130 and/or malicious server 190) by intercepting incoming and outgoing traffic from the IoT devices 110 connected to gateway 120. It should be understood that, in the event that the IoT device 110 was infected, with the installation of the security component of the present disclosure, then the IoT device will interact not only with the cloud service 130 but also with at least one malicious server 190. This may occur not just during initial installation but also after installation, for example, if the IoT device gets infected by direct connection to an attacker. In another scenario, the user may connect a flash drive with a malicious application scripted to the IoT device 110 or connect to the device 110 directly from its device 110 via a cable or wireless connection while bypassing the gateway 120.

When the IoT device 110 interacts with the cloud service 130, communication (traffic) occurs between the malicious server 190 and the applications 140. The interceptor 121, as mentioned above, performs actions to obtain information about the interaction of the IoT devices 110 with at least one of the following: cloud service 130, malicious server 190, other IoT devices 110.

In one example aspect, the interceptor 121 may be configured to:

intercept DNS/HTTP/HTTPS requests from IoT devices 110 on the user's home network;

extract from DNS/HTTP/HTTPS-request of domains and URLs;

intercept the incoming traffic to IoT devices to a predetermined set of TCP/UDP ports (Telecommunications and Networks/Secure Shell (telnet/SSH) ports, and other services that provide remote access to the IoT device 110), while the said set of ports can be changed according to the information received from the security service 160;

check the presence of open TCP/UDP ports (telnet/SSH ports and other services that provide remote access to the device) on IoT devices 110; and identify IoT devices 110.

In addition, the interceptor 121 performs an installation of the security component 125 on the IoT device 110 detected by the analysis tool 122.

The identification, by the analysis tool 122, of the security component 125 that needs to be installed by the interceptor 121 on the device 110 is described below.

In general, the security component 125 is a software and/or hardware solution that provides security for the IoT device 110, or user data on the IoT device 110 in a particular case. For example, the security component for ensuring the safety of user passwords on the smartphone may use a special smartphone chip, or a component encryption—such as according to Advanced Encryption Standard (AES) for the instruction block of the central processor of the IoT device 110, a firmware update component on the IoT device 110 or on the hardware loader of the IoT device 110.

In one aspect, the interceptor 121 transmits the security component 125 to the gateway 120. This approach may be used when installation of the security component on the IoT device itself is not feasible. In one aspect, the security component 125 comprises a Smart Home Security, such as the home security system made by Kaspersky. In another aspect, the security component 125 comprises an IoT Infrastructure based security, such as the Kaspersky IoT Infrastructure Security. Thus, such an implementation provides security to the IoT device 110 in the event that it is not technically possible to install the security component 125 on the IoT device 110. For example, blocking data transmission from the device 110 to other devices 110 using the router is necessary due to the fact that the IoT device 110 is suspected of being infected or the request from the IoT device 110 does not correspond to the user category of the IoT device 110.

In one aspect, the interceptor 121 may install interceptors 121a (e.g., Kaspersky Thin Client) on IoT device 110. It is important to understand that the interceptor 121a performs the same functions on the IoT device 110, but the hardware and software implementation of the interceptor 121a differs depending on the identification of the IoT device 110. In general, identification is performed by the interceptor 121 by methods known in the art by determining, for example, the type of device 110, the hardware of the device 110, communication interfaces with the device 110. In one aspect, the assembly and transmission of the interceptor 121a, which is to be installed on the device 110, executes the security service 160. For example, transmission of the interceptor 121a may be through a security application 170 that assembles the interceptor 121a for a particular device 110.

In one aspect, the interceptor 121a performs the same functions as the interceptor 121, but for devices that are connected to the IoT device 110 but are not connected to the gateway 120. For example, the interceptor 121a analyzes which other devices are connected to the IoT device 110

(smartphone or tablet of users), and the present system ensures their security (for example, a smart watch can be connected to a smartphone without communication with the gateway 120, and CCTV cameras or sensors can be connected to the tablet).

In one aspect, the information intercepted by the interceptor 121 is transmitted to the analysis tool 122 to determine the category of the IoT device 110 and the category of the user of the IoT device 110 by interacting with the security service 160 based on the data received from the interceptor 121 and the security service 160, and possible problems of information security and cyber threats in the network. The analysis tool 122 is associated with the database 123 that stores a description (data/information) of the devices 110 and a description of the remote servers. The remote servers may be malicious (e.g., malicious server 190, as shown in FIG. 2) or secure servers (not shown in FIG. 2). The description of remote servers can contain at least the URLs of remote servers, as well as additional certificates and certificate chains of remote servers, convolution on http responses or pages of remote servers. In general, the implementation of the method of the present disclosure in connection with the limited amount of memory on the gateway 120 of the databases 123 contains the most up-to-date data on IoT devices 110 of the user. It is worth noting that the data for storing in databases 123 comprises data received by the analysis tools 122 from the security service 160 (an example will be discussed below).

In one aspect, the analysis tool 122 performs at least one of the following actions to determine the category of the IoT device 110 and the category of the user of the IoT device 110:
- determines a description of the IoT device 110 (e.g., by requesting the IoT device 110 at the port number, opening a web page at IoT device 110, other methods known in the art), wherein the description at least comprises the type of the IoT device 110 (e.g., a webcam), the manufacturer of the IoT device 110 (e.g. Xiaomi), the model and make of the IoT device 110 (e.g. XVV-B 10), and the firmware of the IoT device 110 (software version of the IoT device 110);
- receives information about the IoT device 110 from the security service 160 in the event that a new IoT device 110 is detected on the network, while the information includes at least telnet/SSH ports of the IoT device 110, allowed domains and URLs for the IoT device 110, as well as allowed for interaction of the IoT device 110 in the network (for example, the webcam can interact with other cameras or with the IP video recorder and send initialization requests itself);
- checks domains and URLs from the intercepted traffic to identify the address of the IoT device 110 performs requests;
- checks the domains and URLs from the intercepted traffic on the database of domains and URLs, which is part of the database 123, to determine whether they are used by malicious applications for IoT device 110;
- checks the domains and URLs from the intercepted traffic on the database of domains and URLs (is part of the database 123) used by known secure applications for IoT devices 110;
- checks the traffic intercepted through the hash database of malicious applications for IoT devices 110 (is part of the database 123);
- checks intercepted traffic on the hash database of known secure applications for IoT devices 110 (is part of the database 123).

The category of the IoT device 110 of the user can be determined based on the data mentioned above, for example, using statistical data or machine learning-trained models. For example, the IoT device 110, which is a television, can be classified as a "general device" used by various family members or employees of the enterprise. In one aspect, when determining, for example, a smartphone or tablet and checking the domain and URL from the intercepted traffic, you can categorize the user by age. For example, suppose requests go to sites dedicated to computer games, the IoT device 110 is used during time intervals from 7 hours to 21 hours. Probably, such a IoT device 110 is used by a child—thus, the category of the user of the IoT device is a "child". In one aspect, based on the category of sites, the category of the user of the IoT device may further be categorized by age of the child (for example, up to 12 years).

In one aspect, the analysis tool 122 identifies at least one security component 125 that needs to be installed on the user IoT device 110 depending on certain categories of the IoT device 110 and the category of the user of the IoT device 110, and performs the following actions:

If domains and/or URLs used by known malicious applications for IoT devices 110 from said database are detected in outbound traffic, the analysis tool 122 may decide to install the security component 125 and communicate this decision to the interceptor 121. The security component 125 blocks these domains and URLs. In this case, the IoT device 110 is probably infected. In one aspect, the analysis tool 122 informs the user. For example, the user may be notified by sending an alert to the user's IoT device 110 via e-mail, push notification, and other means of receiving information, or by transmitting data for notifying the user to the security service 160.

If malicious application hashes are detected in the incoming traffic to the IoT device 110, the analysis tool 122 decides to install the security component 125 on the IoT device 110. The security component 125 blocks the transmission of traffic. In one aspect, when malicious application hashes are detected, the method notifies the user of the IoT device 110.

If the IoT device is suspected of being infected, the analysis tool 122 decides to install the security component 125 in the IoT device 110 if the possibility of such an installation exists and transmits the decision to interceptor 121. The security component can perform an anti-virus scan of the IoT device 110, in ways known in the art (for example, signature or heuristic). For example, such installation is possible using Kaspersky's Internet Security for Android.

In one aspect, in the case of determining the category of the user of the IoT device 110, the analysis tool 122 decides to install a security component 125 that corresponds to the interests of the user, for example, for content filtering, parental control, etc.

If anomalies are detected in the intercepted traffic of the IoT device 110 (in this case, the device 110 is probably infected), the analysis tool 122 decides to install the security component 125, which blocks connections related to the anomaly, and transmits a this decision to the interceptor 121. In one aspect, the IoT device 110 also warns the user about the detected anomaly.

In one aspect, the anomaly may comprise an identified deviation in the traffic of IoT devices 110 over a period of time. For example, when searching for passwords from the outside, an anomaly may be detected, if the number of connections to IoT devices 110 from different IP addresses increases. Such IoT devices 110 may then be considered infected within the scope of the present disclosure, since there is a non-zero probability of guessing the password, even if it has been changed. It is noted that IoT devices 110 often, due to their simplicity, do not have any protection against brute force attempts to guess passwords, do not set timeouts after several incorrect password attempts (for example, 30 seconds after three incorrect password inputs). In devices that are not as simple as the IoT devices, time allocated for entering a password is typically short, so the password is relatively fast to enter, and necessarily making it impossible to guess the password itself. Thus, for IoT devices, when an anomaly is detected, the device needs to block connections and warn the user about the anomaly.

In another example, suppose is the IoT device 110 scans the IP addresses of the network and attempts to connect to other IoT devices 110. In this case, the IoT device needs to block connections and warn the user about the attempted connections.

In another example, suppose that the IoT device 110, categorized as a "child device", begins making requests to adult sites or accessing domains and URLs used by malicious applications for IoT devices 110. Then, in this case, it is necessary to install security components 125 that allow the user to block connections (for example, using the "parental control" functionality) and to perform an anti-virus scan.

In one aspect, if the analysis tool 122 does not detect a security component 125, the analysis tool 122 sends a request to the security service 160, where the request is to determine which security component 125 needs to be installed.

The security service 160 interacts with the analysis tool 122. In one aspect, the security service 160 is a service on a remote server, wherein the security service 160 may be a cloud service or a service in a local network. The security service 160 provides data for storing in the database 123, which includes data associated with IoT devices 110, data containing information about cyber threats depending on the category of IoT device 110 and the category of the user of the IoT device 110. Thus, the data stored in the database 123 describes the security component depending on cyber threats. In one aspect, the database 123 may be divided into a plurality of different databases.

In one aspect, the data associated with IoT devices 110 include at least one of:
  a description of the IoT devices 110 (as described above);
  firmware for IoT devices 110; and
  weak password for IoT devices 110 (e.g., both in the form of a list of passwords and in the form of regular expressions).

In one aspect, the data containing information about cyber threats depending on the category of IoT device 110 and the category of the user of the IoT device 110 include at least one of:
  domains and URLs used by malicious applications for IoT devices 110;
  Telnet and SSH ports are open for IoT devices 110 (it should be understood that the ports may differ depending on the current firmware of the IoT device 110); and
  data for detecting malicious applications on the device 110.

In one aspect, the data describing the security component depending on cyber threats include at least one of:
  a security component 125 that may be installed on the IoT device 110 depending on the description of the IoT device 110; and
  an interceptor 121*a* that may be installed on the IoT device 110 depending on the description of the IoT device 110.

In one aspect, as mentioned above, the security service 160 performs the assembly of the security component 125, as well as the assembly of the interceptor 121*a*. The assembly of the security component comprises, for example, compiling and linking or generating a script for the interpreter of the IoT device 110.

It is worth noting that the data of the domains and URLs used by malicious applications for IoT devices 110, in a preferred aspect, is formed using security applications 170, which can be used as a pre-configured virtual machine located on the Internet without security solutions, emulating IoT devices 110 and containing all known vulnerabilities used by malicious applications for hacking such virtual machines. For example, the virtual machine may be the so-called IoT-Honeypot.

Within the scope of the present disclosure, weak passwords may include:
  passwords that do not meet the requirements for safety (for example, words from a dictionary without capital letters, numbers and/or special characters),
  "factory" passwords as set by the manufacturer,
  default login passwords (e.g., admin: admin), and
  leaked passwords to the Internet network (for example, in a publication about vulnerabilities in the press, from databases of passwords of known leaks distributed in "dark" segments of the Internet, which are hidden by networks, connections in which are established only between trusted nodes using non-standard protocols and ports, such as on the Darknet).

In one aspect, weak passwords can be obtained using the security applications 170 by using the IoT-Honeypot.

In one aspect, the security service 160 notifies the user of the IoT devices 110 according to the data from the analysis tool 122.

In one aspect, the security service 160 augments databases 123 based on data from the analysis tool 122. For example, if the analysis tool 122 detects open ports on the IoT device 110 not previously known to the security service 160, or transmits data about anomalies using previously unknown domains and URLs, then the data can be analyzed by the security service 160 and added to databases 123 for future reference.

It is worth noting that the interceptors 121, the analysis tools 122, and the security components 125 can be executed both as components of the anti-virus solution and as an Endpoint Detection and Response (EDR) solution, e.g. Kaspersky EDR. In this case, the decision on the action to ensure security takes place in the security service 160.

Figure 3:
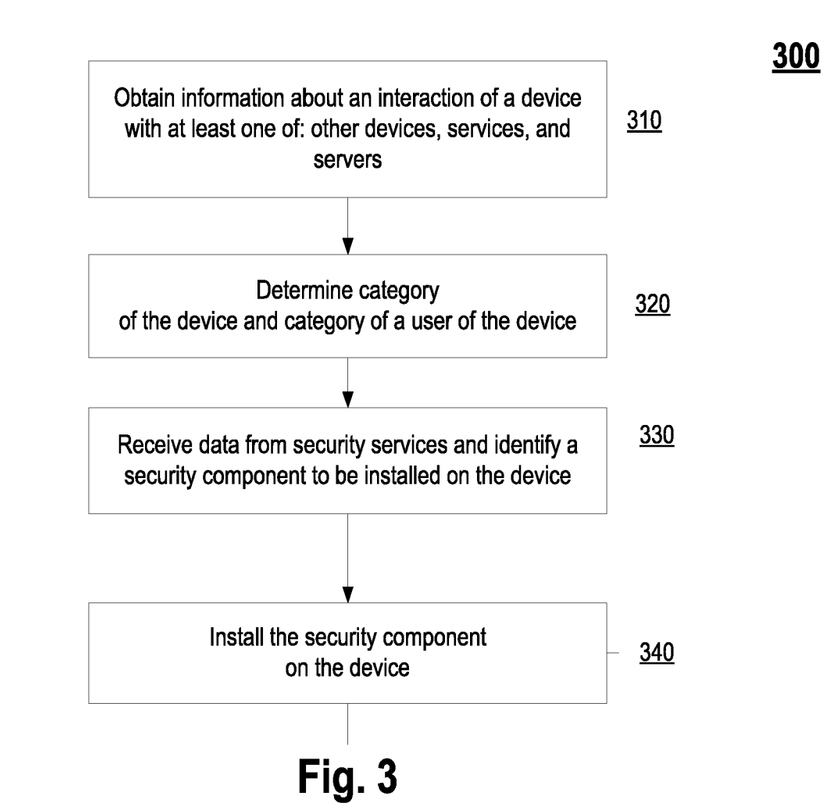
FIG. 3 illustrates a method for providing security to a network device, e.g., an IoT device, by installing security components in accordance with aspects of the present disclosure.

FIG. 3 illustrates a method 300 for providing security to a network device, e.g., an IoT device, by installing security components in accordance with aspects of the present disclosure.

In step 310, via the interceptor 121 which is hosted on the gateway 120, method 300 obtains information about an interaction of an IoT device 110 with at least one of: one or more other IoT devices 110, a cloud service 130, and a malicious server 190. The interceptor 121 was described above in conjunction with FIG. 2.

In one aspect, obtaining the information about the interaction of the IoT device 110 with the other IoT devices 110, cloud service 130, and the malicious server 190 is performed by:
  intercepting requests to and from IoT devices 110;
  extracting data about domains and URLs from the intercepted requests;
  intercepting incoming traffic to IoT devices 110 on a predetermined set of TCP/UDP ports;

checking whether an IoT device 110 has an open TCP/UDP port that provides a remote access to the respective IoT device 110.

In one aspect, the intercepted requests comprise DNS/HTTP/HTTPS requests.

In step 320, by the analysis tool 122 which is located on at least one gateway 120, method 300 determines at least one category of the IoT device 110 and at least one category of the user of the IoT device 110. In one aspect, the at least one category of the IoT device and the at least one category of the user of the IoT device are determined: by interacting with the security service 160 based on the information about the interaction of the IoT device obtained from the interceptor 121, wherein the security service 160 is designed to provide data to the analysis tool 122. In one aspect, through the interaction, a description of the device 110 is revealed, wherein the description comprises at least the type of device 110, the manufacturer of the device 110, the model of the device 110, the firmware of the device 110.

In one aspect, the information about the interaction of the IoT device 110 is contained in a database.

In one aspect, the database contains at least:
data associated with the IoT devices 110;
data containing information about cyber threats, wherein the information about the cyber threats for a particular IoT device depends on the category of the particular IoT device 110 and the category of the user of the particular IoT device 110; and
for a particular IoT device 110, a description of the security component, wherein the description of the security component for the particular IoT device 110 depends on cyber threats.

In one aspect, the data associated with the IoT devices 110 comprises at least one of:
descriptions of the IoT devices 110 (as described above);
firmware for the IoT devices 110; and
weak passwords for the IoT devices 110.

In one aspect, the data containing the information about the cyber threats comprises at least one of:
domains and URLs used by malicious applications for IoT devices 110;
for IoT devices 110 open telnet/SSH ports based on the particular IoT device 110 (it should be understood that the ports may differ depending on the current firmware of the IoT device 110); and
data for detecting malicious applications on the IoT device 110.

In one aspect, the description of the security component that depends on the category of the IoT device 110 and the category of the user of the IoT device 110 includes at least one of:
a security component 125 that may be installed on the IoT device 110 depending on the description of the IoT device 110; and
an interceptor 121*a* that may be installed on the IoT device 110 depending on the description of the IoT device 110.

In one aspect, using the analysis tool 122, method 300 determines the category of the IoT device 110 and the category of the user of the IoT device 110 by interacting with the remote security server 160 based on the data received from the interceptor 121. Then, a description of the IoT device 110 is revealed, wherein the description comprises at least the type of IoT device 110, the manufacturer of the IoT device 110, the model of the IoT device 110, the firmware of the IoT device 110. The method then receives information about the IoT device 110 from the security service 160, wherein the information comprises at least the Telnet/SSH ports of the IoT device 110, allowed domains, and URLs for the IoT device 110, as well as devices allowed for interaction on the network. The method checks domains and URLs from the intercepted traffic against the database of domains and URLs used by malicious applications for IoT devices 110 based on the data provided by the security service 160.

In step 330, by the analysis tool 122, method 300 receives data from the at least one security service and identifies the security component to be installed on the device based on the data received from the at least one security service, the at least one category of the device and the at least one category of a user of the device. In one aspect, the data comprises: data about the device, data about cyber threats depending on the least one category of the device and at least one category of a user of the device, and data describing a security component, wherein the security component is based on at least one type of cyber threat. For example, depending on certain categories of the IoT device 110 and the category of the user of the IoT device 110, method 300 identifies a security component 125 that needs to be installed on the IoT device 110. Examples of identifying the security component 125 are discussed in conjunction with FIG. 2.

In one aspect, the analysis tool 122 determines which security component 125 needs to be installed on the device 110 by sending a request to the security service 160.

In one embodiment, the security service 160 assembles the security component 125 and transmits it to the analysis tool 122.

In step 340, by the interceptor 121, method 300 installs the security component 125 identified by the analysis tool 122 on the user device 110.

In one aspect, method 300 also installs an interceptor 121*a* on the IoT device 110 of the user.

FIG. 4 is a block diagram illustrating a computer system 20 on which aspects of systems and methods for providing security to a network device, e.g., an IoT device, by installing security components may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing security to an Internet of Things (IoT) device comprising:
    installing, by an interceptor located on at least one gateway, an interceptor on the IoT device;
    obtaining, by the interceptor located on at least one gateway or the IoT device, information about an interaction of the IoT device with at least one of: one or more other IoT devices, a service, and a server;
    performing by an analysis tool located on the at least one gateway the steps of:
        determining at least one category of the IoT device and at least one category of a user of the IoT device by interacting with at least one security service based on the information received about the interaction of the IoT device from the interceptor located on at least one gateway or the IoT device;
        receiving data from the at least one security service, the data comprising: data about the IoT device, data about cyber threats depending on the at least one category of the IoT device and at least one category of a user of the IoT device, and data describing a security component for providing a cyber protection to the IoT device; and
        identifying the security component based on the data received from the at least one security service, the at least one category of the IoT device and the at least one category of a user of the IoT device; and
    installing, by the interceptor located on at least one gateway or the IoT device, the identified security component on the IoT device; or
    installing, by the interceptor located on at least one gateway or the IoT device, the identified security component on the gateway in response to determining that installation of the security component on the IoT device is not possible.

2. The method of claim 1, wherein the interceptor obtains the information about the interaction of the IoT device by performing at least one of:
    intercepting Domain Name Service (DNS)/Hypertext Transfer Protocol (HTTP)/Hypertext Transfer Protocol Secure (HTTPS) requests from devices;
    extracting domain and Uniform Resource Locator (URL) data from the intercepted requests;
    intercepting incoming traffic to devices on a predefined set of Transmission Control Protocol/User Datagram Protocol (TCP/UDP) ports; and
    checking whether the IoT device has an open TCP/UDP port that provides remote access to the IoT device.

3. The method of claim 1, wherein the data about the IoT device includes at least one of: a description of the IoT device, a firmware of the IoT device, and a weak password for the IoT device.

4. The method of claim 1, wherein the data about cyber threats depending on the least one category of the IoT device and at least one category of a user of the IoT device comprise at least one of:
    a domain and URL used by malicious device applications,
    data aboutopen Telecommunications and Networks/Secure Shell (telnet/SSH) ports for the IoT device, and
    data for detecting malicious applications when a malicious application is invoked.

5. The method of claim 1, wherein the IoT device includes the security component or the interceptor depending on the description of the IoT device.

6. The method of claim 1, wherein the security service assembles the security component.

7. An Internet of Things (IoT) device security system comprising:
    at least one gateway comprising at least one hardware processor and at least one memory,
    the gateway including an analysis tool and an interceptor, the gateway communicating with at least one IoT device and at least one security service,
    wherein the interceptoris configured to install an interceptor on the IoT device, and obtain information about an interaction of the IoT device with at least one of: one or more other IoT devices, a service; and
    wherein the analysis tool is configured to:
        determine at least one category of the IoT device and at least one category of a user of the IoT device by interacting with the at least one security service based on the information about the interaction of the IoT device obtained from the interceptor located on at least one gateway or the IoT device,
        interact with the at least one security service to receive data from the at least one security service, and
        identify the security component based on data received from the security service, the determined at least one category of the IoT device and the at least one category of a user of the IoT device; and
    wherein the at least one security service provides data to the analysis tool, wherein the data comprises data about the IoT device, data about cyber threats depending on the least one category of the IoT device and at least one category of a user of the IoT device, and data describing the security component for providing a cyber protection to the IoT device, wherein the interceptor located on at least one gateway or the IoT device is configured to install the identified security component on the IoT device; or wherein the interceptor located on at least one gateway or the IoT device is configured to install the identified security component on the gateway in response to determining that installation of the security component on the IoT device is not possible.

8. The system of claim 7, wherein the interceptor obtains the information about the interaction of the IoT device by performing at least one of:

intercepting Domain Name Service (DNS)/Hypertext Transfer Protocol (HTTP)/Hypertext Transfer Protocol Secure (HTTPS) requests from devices;

extracting domain and Uniform Resource Locator (URL) data from the intercepted requests;

intercepting incoming traffic to devices on a predefined set of Transmission Control Protocol/User Datagram Protocol (TCP/UDP) ports; and checking whether the device has an open TCP/UDP port that provides remote access to the device.

9. The system of claim 7, wherein the data about the IoT device includes at least one of: a description of the device, a firmware of the device, and a weak password for the device.

10. The system of claim 7, wherein the data about cyber threats depending on the least one category of the IoT device and at least one category of a user of the IoT device comprise at least one of:

a domain and URL used by malicious device applications, data about open Telecommunications and Networks/Secure Shell (telnet/SSH) ports for the device, and data for detecting malicious applications when a malicious application is invoked.

11. The system of claim 7, wherein the IoT device includes the security component or the interceptor depending on the description of the IoT device.

12. The system of claim 7, wherein the security service assembles the security component.

13. A non-transitory computer readable medium storing thereon computer executable instructions for providing security an Internet of Things (IoT) device, including instructions for:

installing, by an interceptor located on at least one gateway, an interceptor on the IoT device;

obtaining, by the interceptor located on at least one gateway or the IoT device, information about an interaction of the IoT device with at least one of: one or more other IoT devices, a service, and a server;

performing by an analysis tool located on the at least one gateway the steps of:

determining at least one category of the IoT device and at least one category of a user of the IoT device by interacting with at least one security service based on the information received about the interaction of the IoT device from the interceptor located on at least one gateway or the IoT device;

receiving data from the at least one security service, the data comprising: data about the IoT device, data about cyber threats depending on the at least one category of the IoT device and at least one category of a user of the IoT device, and data describing a security component for providing a cyber protection to the IoT device; and identifying the security component based on the data received from the at least one security service, the at least one category of the IoT device and the at least one category of a user of the IoT device; and installing, by the interceptor located on at least one gateway or the IoT device, the identified security component on the IoT device; or installing, by the interceptor located on at least one gateway or the IoT device, the identified security component on the gateway in response to determining that installation of the security component on the IoT device is not possible.

14. The non-transitory computer readable medium of claim 13, wherein the interceptor obtains the information about the interaction of the device by performing at least one of:

intercepting Domain Name Service (DNS)/Hypertext Transfer Protocol (HTTP)/Hypertext Transfer Protocol Secure (HTTPS) requests from devices;

extracting domain and Uniform Resource Locator (URL) data from the intercepted requests;

intercepting incoming traffic to devices on a predefined set of Transmission Control Protocol/User Datagram Protocol (TCP/UDP) ports; and checking whether the device has an open TCP/UDP port that provides remote access to the device.

15. The non-transitory computer readable medium of claim 13, wherein the data about the IoT device includes at least one of: a description of the IoT device, a firmware of the IoT device, and a weak password for the IoT device.

16. The non-transitory computer readable medium of claim 13, wherein the data about cyber threats depending on the least one category of the IoT device and at least one category of a user of the IoT device comprise at least one of:

a domain and URL used by malicious device applications, data about open Telecommunications and Networks/Secure Shell (telnet/SSH) ports for the IoT device, and data for detecting malicious applications when a malicious application is invoked.

17. The non-transitory computer readable medium of claim 13, wherein the IoT device includes the security component or the interceptor depending on the description of the IoT device.

18. The non-transitory computer readable medium of claim 13, wherein the security service assembles the security component.

* * * * *